United States Patent [19]

Carson et al.

[11] Patent Number: 5,394,156

[45] Date of Patent: Feb. 28, 1995

[54] DIGITAL RANGE TURN-AROUND FOR TRACKING, TELEMETRY AND CONTROL TRANSPONDER

[75] Inventors: Lansing M. Carson; Dean J. Boman, both of Chandler, Ariz.

[73] Assignee: Motorola, Inc., Schaumburg, Ill.

[21] Appl. No.: 157,547

[22] Filed: Nov. 26, 1993

[51] Int. Cl.6 .............................................. H04B 7/185
[52] U.S. Cl. ...................................... 342/353; 342/355
[58] Field of Search ..................... 342/50, 51, 194, 195, 342/353, 355

[56] References Cited

U.S. PATENT DOCUMENTS

| | | | |
|---|---|---|---|
| 3,860,421 | 1/1975 | Wood | 343/6.5 R |
| 4,156,873 | 5/1979 | Moore | 342/51 |
| 4,809,006 | 2/1989 | Dar | 342/353 X |

Primary Examiner—Mark Hellner
Attorney, Agent, or Firm—Frank J. Bogacz

[57] ABSTRACT

A transponder demodulates a phase modulated ranging signal transmitted by an earth station. The transponder converts the analog ranging signal to digital form. The digital ranging signal is demodulated into its I and Q phase components. Next the demodulated ranging signal is re-modulated and digitally combined with a selected transmit frequency. Then the re-modulated ranging signal is converted from digital to analog form. The ranging signal is transmitted to the earth station.

20 Claims, 3 Drawing Sheets

DIGITAL RANGE TURN-AROUND FOR TRACKING, TELEMETRY AND CONTROL TRANSPONDER

BACKGROUND OF THE INVENTION

The present invention pertains to ground control to satellite communication and more particularly to a digital ranging turn-around transponder arrangement.

Tracking, telemetry and control transponder on satellites receive signals from ground stations and may pass through (turn-around) these signals and re-transmit them to the earth station which originally sent the signals. By the re-transmission of a signal from the earth station to a satellite back to the earth station, information regarding the satellite's orbit may be determined by the earth station.

Typical tracking, telemetry and control transponders are implemented with analog technology and require that the transponder demodulate a phase modulated ranging signal. The phase modulated ranging signal is extracted from the carrier signal, filtered, re-modulated and re-transmitted to the earth station. Analog phase detectors, filters and modulator are typically employed to perform these functions.

As more of the satellite's circuitry has become digital it has become inefficient and costly to continue the implementation of the ranging functions in analog circuitry.

Accordingly, it is an advantage of the present invention to provide improved tracking, telemetry and control transponder performance by minimizing the delay variation of the transmitted signals between the earth station and the transponder of the satellite.

SUMMARY OF THE INVENTION

In accordance with the present invention, a novel digital tracking, telemetry and control transponder is shown.

A tracking, telemetry and control transponder includes a digital ranging arrangement. The ranging arrangement includes an analog/digital converter for converting a received ranging signal to digital form. A demodulator digitally converts the digital form of the ranging signal to digital baseband form. The demodulator is coupled to the analog/digital converter. A modulator digitally converts the digital baseband form of the ranging signal to a re-modulated ranging signal in digital form. The modulator is coupled to the demodulator. A digital/analog converter converts the digital re-modulated ranging signal to analog form. The digital/analog converter is coupled to the modulator

DESCRIPTION OF THE PREFERRED EMBODIMENT

Figure 1:
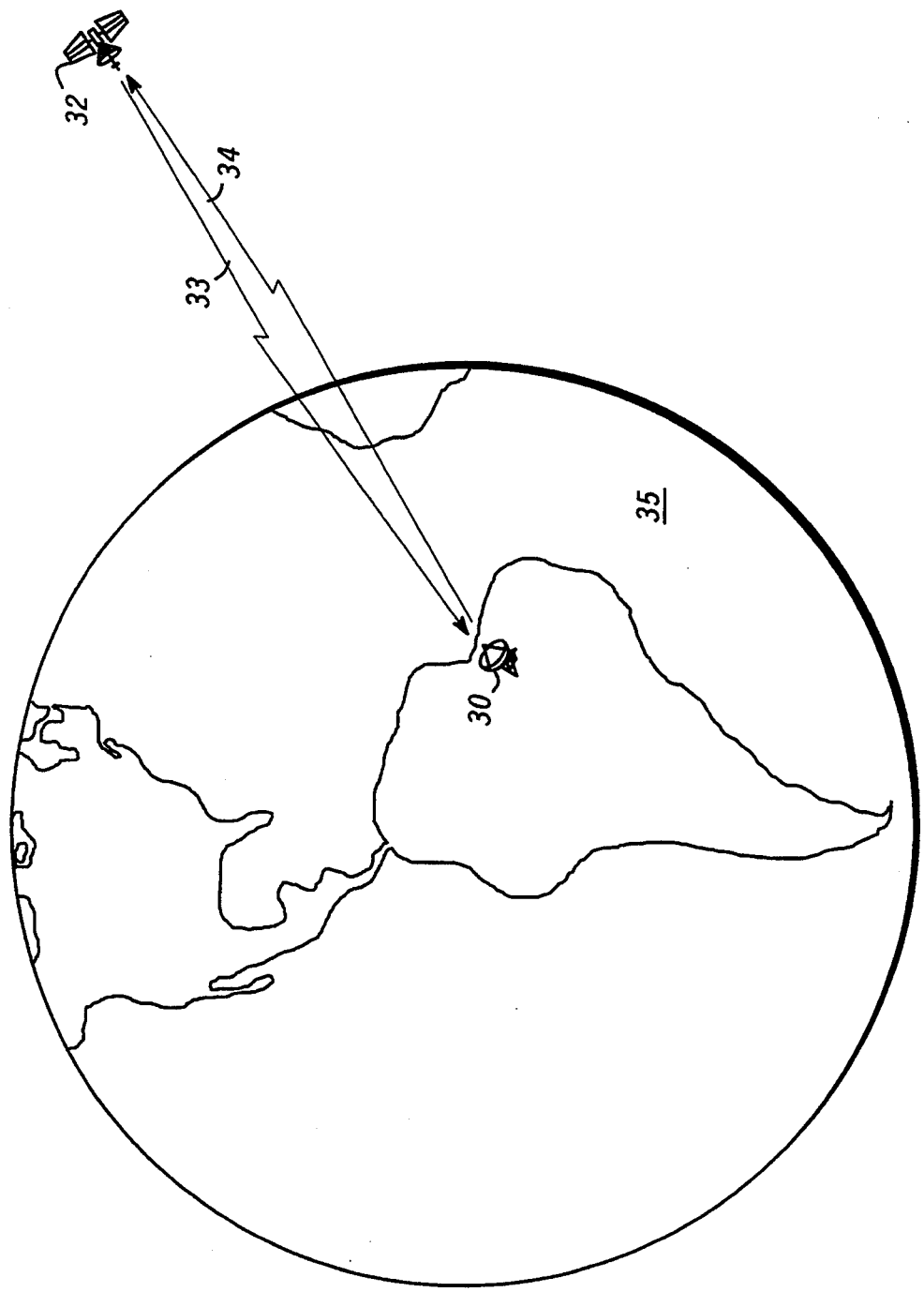
FIG. 1 is a layout of a communication arrangement between a satellite and an earth station in accordance with the present invention.

FIG. 1 is a layout of a communication arrangement between a satellite 32 and an earth station 30 located on the earth 35. Earth station 30 transmits a signal 34 to satellite 32. Satellite 32 receives signal transmission 34 and digitally demodulates signal 34 and then remodualtes signal 34 to form signal 33. Satellite 32 then transmits the remodulated signal 33 back to earth station 30. From this transmitted signal 34 and re-transmitted signal 33, earth station 30 can determine the position and basic functioning of satellite 32. Earth station 30 may then send corrective signals to satellite 32 to correct any functional problems.

Figure 2:
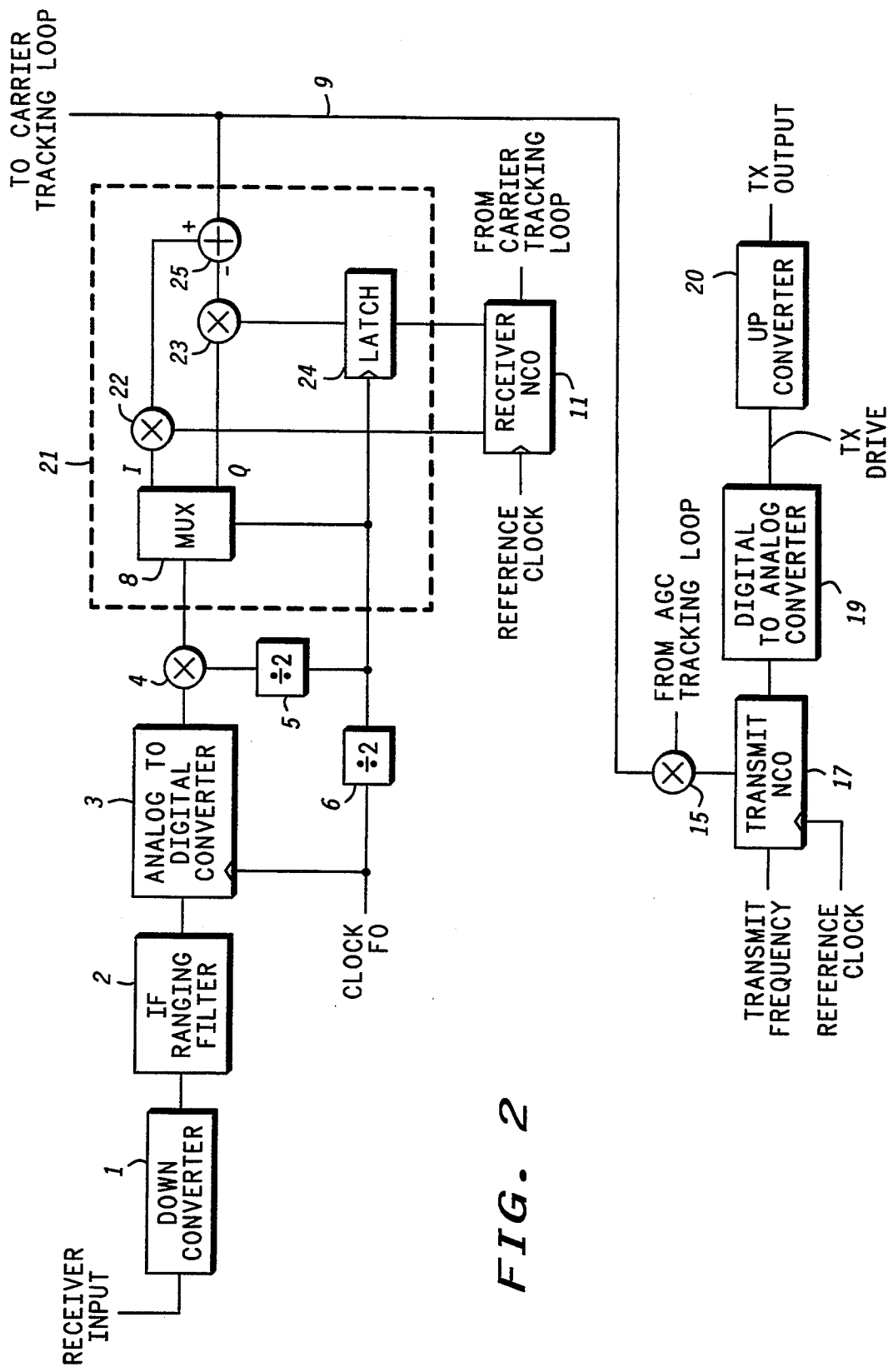
FIG. 2 is a block diagram of a digitally implemented range turn-around arrangement for a tracking, telemetry and control transponder in accordance with the present invention.

Referring to FIG. 2 a block diagram of a digital tracking, telemetry and control (TTC) transponder is shown. This circuitry is part of a satellite 32.

An earth station 30 transmits a ranging signal to satellite 32 for re-transmission. The ranging signal includes information which the earth station uses when returned to make determination regarding the satellite. The signals are received by antenna and receiver (not shown) of the satellite and transmitted to down converter 1. Down converter 1 translates the ranging signals from the RF frequencies used for the earth station/TTC link, typically S band, to a frequency of $((n/4)+F_0+F_{offset})$. N is an odd integer and $F_0$ is a reference and $F_{offset}$ is an offset frequency used to absorb the doppler shift of the transmitted ranging signal.

IF ranging filter is coupled to down converter 1. Analog to digital (A/D) converter 3 is coupled to IF ranging filter 2. Multiplier 4 is coupled to A/D converter 3. Divide by 2 circuit 6 is coupled to A/D converter and to a source of the reference frequency $F_0$. Divide by 2 circuit 5 is coupled between divide by 2 circuit 6 and multiplier 4.

The common connection of divide by circuits 5 and 6 is coupled to multiplexer 8. Further multiplexer 8 is coupled to multiplier 4.

Multiplexer 8 is coupled to multipliers 22, 23 and adder 25; and latch 24 comprise a single sideband down converter. Multiplexer 8 is coupled to multipliers 22 and 23. Adder 25 is coupled to multipliers 22 and 23. Latch 24 is coupled to multiplier 23, to the common connection of divide by 2 circuits 5 and 6 and to receiver NCO 11. Multiplier 22 is also coupled to receiver NCO 11.

IF ranging filter 2 performs range filtering on the previously demodulated baseband ranging signal. A/D converter 3 converts the filtered IF signal to digital when it sampled by the clock frequency $F_0$ by converter 3. $F_0$ can be an arbitrary frequency, but the ratio between the IF ranging signal and the sampling rate should be as given above, $((n/4)+F_0+F_{offset})$.

Next, the samples of A/D converter 3 are multiplied by $F_0/4$ in multiplier 4 because each divide by 2 circuit 5 and 6 divides the primary clock frequency $F_0$ by one-half. The sampling of converter 3 and multiplication of multiplier 4 creates complex in phase (I) and quadrature (Q) signals of the IF signal and translate the frequency of the IF signal to the center frequency of $F_{offset}$.

The I and Q samples are processed by the single sideband down converter 21 to make final down conversion to baseband. Also the ranging modulation is extracted from the complex IF signal. Single sideband down converter 21 sorts the I and Q samples into separate I and Q paths by multiplexer 8. The I lead from multiplexer 8 is multiplied by the sine function output of receiver numerically controlled oscillator (NCO) 11. The frequency of receiver NCO 11 is controlled by the receiver carrier tracking loop (not shown) via the SPE lead to receiver NCO 11. The carrier tracking loop adjusts the frequency and phase of the NCO 11 to equal the frequency and phase of the received ranging signal.

The Q samples from multiplexer 8 are multiplied by the cosine function signal output by receiver NCO 11 by multiplier 23. The output of multiplier 23 is inverted and its value is effectively subtracted the output of multiplier 22 by adder 25 to produce the single sideband down converter output 9. Output 9 includes the demodulated ranging signal and carrier loop tracking error information which is used by the carrier tracking loop (not shown) to control phase and frequency of the receiver NCO 11. The carrier tracking loop may be implemented by standard well known circuitry.

Multiplier 15 is coupled to adder 25 and receives the demodulated ranging signal. Multiplier 15 is also coupled to an automatic gain control (AGC) loop (not shown). The AGC loop may also be implemented with well known AGC circuitry. The AGC input to multiplier 15 is controlled by the AGC tracking loop. The AGC tracking loop maintains the signal level constant regardless of the input IF ranging signal.

Multiplier 15 is coupled to transmit NCO 17. NCO 17 also has a transmit frequency input and a reference clock input. Transmit NCO 17 is coupled to digital to analog (D/A) converter 19. D/A converter 19 is coupled to up converter 20 and provides the transmission back to the earth station.

The output of multiplier 15 is transmitted to the phase modulation input of transmit NCO 17. The transmit frequency used to transmit information to the earth station is sent to the transmit NCO 17 on the transmit frequency lead. This frequency is selectable. The output of the transmit NCO 17 is modulated with the demodulated ranging signal of multiplier 15. The modulated output of NCO 17 is then converted from digital to analog by digital to analog (D/A) converter 19. This modulated analog output is transmitted on the TX drive lead to up converter 20. The TX drive signal is used to drive up converter 20 for final conversion of the modulated analog signal for transmission. This TX output signal is typically in the S band range.

Figure 3:
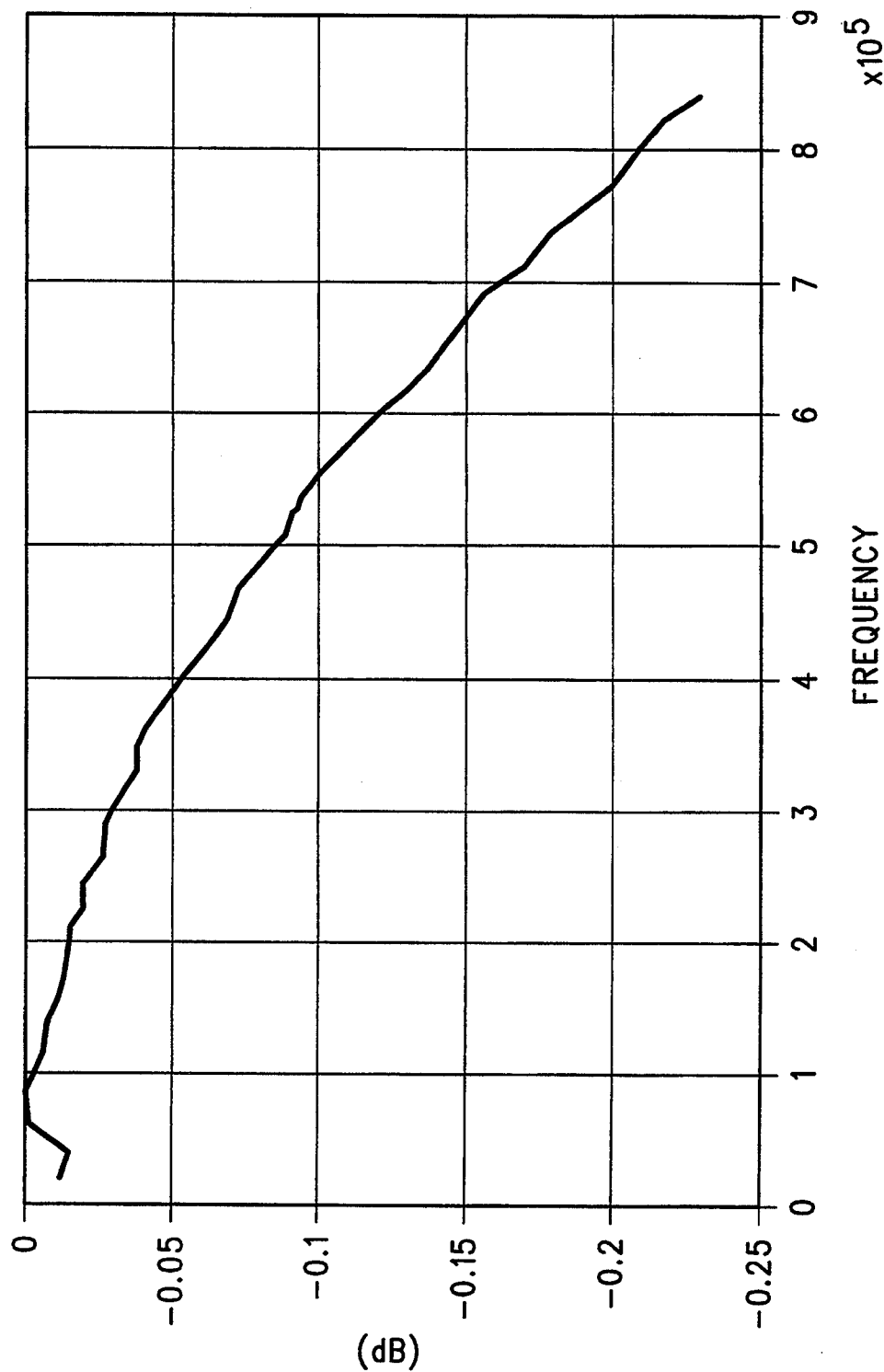
FIG. 3 is a graph of signal loss versus frequency for the digital range turn-around arrangement in accordance with the present invention.

FIG. 3 depicts the amplitude roll off as a function of frequency. Ranging signals typically have a bandwidth of approximately 500 KHz. It is desirable to limit the frequency roll off to less than 0.16 dB. FIG. 3 depicts the relatively low roll off in the 0.1 to 0.7 MHz range.

The invention described hereinabove offers the advantages of eliminating additional analog circuitry and improves the satellite's transponder performance by minimizing delay.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. A digital ranging arrangement for a tracking, telemetry and control transponder comprising:
 analog/digital converter means for converting a received ranging signal in analog form to a digital ranging signal;
 demodulator means for digitally converting said digital ranging signal to a digital baseband signal, said demodulator means coupled to said analog/digital converter means;
 modulator means for digitally converting said digital baseband signal to a re-modulated ranging signal in digital form, said modulator means coupled to said demodulator means; and
 digital/analog converter means for converting said re-modulated ranging signal in digital form to analog form, said digital/analog converter means coupled to said modulator means.

2. A digital ranging arrangement as claimed in claim 1, wherein there is further included down converter means for receiving said ranging signal from a source.

3. A digital ranging arrangement as claimed in claim 2, wherein here is further included filtering means for filtering said received ranging signal, said filtering means coupled between said down converter means and said analog/digital converter means.

4. A digital ranging arrangement as claimed in claim 1, wherein there is further included:
 divider means for producing a sampling signal from a predetermined reference frequency signal; and
 first multiplier means for sampling said ranging signal at a rate of said sampling signal to produce I and quadrature Q signals, said first multiplier means coupled to said divider means and to said analog/digital converter means.

5. A digital ranging arrangement as claimed in claim 4, wherein there is further included multiplexer means for sampling said I and quadrature Q signals to digitize said I and Q signals, said first multiplexer means coupled to said first multiplier means and to said divider means.

6. A digital ranging arrangement as claimed in claim 5, wherein there is further included:
 second multiplier means for multiplying said I signal by a sine function of said predetermined reference frequency signal to produce a first signal, said second multiplier means coupled to said multiplexer means; and
 third multiplier means for multiplying said Q signal by a cosine function of said predetermined reference frequency signal to produce a second signal, said third multiplier means coupled to said multiplexer means.

7. A digital ranging arrangement as claimed in claim 6, wherein there is further included adder means for adding said first signal with a negative of said second signal to produce a tracking signal at baseband, said adder means coupled to said second and third multiplier means.

8. A digital ranging arrangement as claimed in claim 7, wherein there is further included receiver numerically controlled oscillator means for producing said sine function and said cosine function of said predetermined reference frequency signal, said receiver numerically controlled oscillator means coupled to said second and to said third multiplier means.

9. A digital ranging arrangement as claimed in claim 7, wherein there is further included fourth multiplier means for multiplying an automatic gain control signal by said tracking signal, said fourth multiplier signal coupled to said adder means.

10. A digital ranging arrangement as claimed in claim 9, wherein there is further included transmit numerically controlled oscillator means for re-modulating said tracking signal which is automatically gain controlled, said transmit numerically controlled oscillator means coupled to said fourth multiplier means.

11. A digital ranging arrangement as claimed in claim 10, wherein there is further included digital/analog converter means for converting said re-modulated tracking signal to digital form, said digital/analog converter means coupled to said transmit numerically controlled oscillator means.

12. A digital ranging arrangement as claimed in claim 11, wherein there is further included up converter means for transmitting said digital form of said re-modulated tracking signal, said up converter means coupled to said digital/analog converter means.

13. A digital ranging arrangement as claimed in claim 1, wherein there is further included earth station means for transmitting said ranging signal.

14. A digital ranging arrangement as claimed in claim 13, wherein there is further included satellite means for receiving said ranging signal transmitted by said earth station means, said satellite means RF coupled to said earth station means, said satellite means including said tracking, telemetry and control transponder.

15. A digital ranging arrangement as claimed in claim 6, wherein there is further included latching means coupled to said receiver numerically controlled oscillator means, to said third multiplier means and to said divider means.

16. A digital ranging arrangement as claimed in claim 15, wherein said divider means includes:
   first divide by two means coupled to said multiplexer means and to latching means; and
   second divide by two means coupled to said first multiplier means and to said first divide by two means.

17. A digital ranging arrangement for a tracking, telemetry and control transponder comprising:
   an analog/digital converter for converting a received ranging signal in analog form to a digital ranging signal;
   a demodulator for digitally converting said digital ranging signal to a digital baseband signal, said demodulator coupled to said analog/digital converter;
   a modulator for digitally converting said digital baseband signal to a re-modulated ranging signal in digital form, said modulator coupled to said demodulator; and
   a digital/analog converter for converting said re-modulated ranging signal in digital form to analog form, said digital/analog converter coupled to said modulator.

18. A digital ranging system for tracking, telemetry and control of a satellite by an earth station, said digital ranging system comprising:
   said earth station for transmitting a ranging signal;
   said satellite including:
      converter means for receiving said ranging signal;
      analog/digital converter means for converting said received ranging signal to a digital ranging signal;
      demodulator means for digitally converting said digital ranging signal to a digital baseband signal, said demodulator means coupled to said analog/digital converter means;
      modulator means for digitally converting said digital baseband signal to a re-modulated ranging signal in digital form, said modulator means coupled to said demodulator means;
      digital/analog converter means for converting said re-modulated ranging signal in digital form to analog form, said digital/analog converter means coupled to said modulator means; and
      transmitter means for transmitting said analog form of said re-modulated ranging signal to said earth station.

19. A digital ranging system as claimed in claim 18, wherein said demodulator means includes:
   divider means for producing a sampling signal from a predetermined reference frequency signal;
   first multiplier means for sampling said ranging signal at a rate of said sampling signal to produce I and quadrature Q signals, said first multiplier means coupled to said divider means and to said analog/digital converter means;
   multiplexer means for sampling said I and quadrature Q signals to digitize said I and Q signals, said multiplexer means coupled to said first multiplier means and to said divider means;
   second multiplier means for multiplying said I signal by a sine function of said predetermined reference frequency signal to produce a first signal, said second multiplier means coupled to said multiplexer means;
   third multiplier means for multiplying said Q signal by a cosine function of said predetermined reference frequency signal to produce a second signal, said third multiplier means coupled to said multiplexer means; and
   adder means for adding said first signal with a negative of said second signal to produce a tracking signal at baseband, said adder means coupled to said second and third multiplier means.

20. A digital ranging system as claimed in claim 19, wherein said modulator means includes:
   fourth multiplier means for multiplying an automatic gain control signal by said tracking signal, said fourth multiplier signal coupled to said adder means; and
   transmit numerically controlled oscillator means for re-modulating said tracking signal which is automatically gain controlled, said transmit numerically controlled oscillator means coupled to said fourth multiplier means.

* * * * *